United States Patent [19]
Peterson

[11] Patent Number: 5,816,198
[45] Date of Patent: Oct. 6, 1998

[54] COUNTERWEIGHTED PET LEASH RETRACTING COLLAR

[76] Inventor: Edwin R. Peterson, 4420 Hillcrest, Boise, Id. 83705

[21] Appl. No.: 947,013

[22] Filed: Oct. 8, 1997

[51] Int. Cl.⁶ .................................................. A01K 27/00
[52] U.S. Cl. ............................................................ 119/794
[58] Field of Search ............................. 119/769, 792–796

[56] References Cited

U.S. PATENT DOCUMENTS 2,889,807  6/1959  Beebe ....................................... 119/794
4,964,370  10/1990  Peterson ................................... 119/795
5,197,413  3/1993  Gyr .......................................... 119/792

Primary Examiner—Thomas Price
Attorney, Agent, or Firm—Frank J. Dykas

[57] ABSTRACT

A pet leash retracting collar which includes a pet collar with reflective strip, a leash, a counterweight, and a leash retractor. The pet leash retractor collar is weighted using the counterweight so that the pet leash retractor rests in a position superior to the pet's neck, when the pet's neck is in a generally horizontal position.

5 Claims, 4 Drawing Sheets

COUNTERWEIGHTED PET LEASH RETRACTING COLLAR

BACKGROUND OF THE INVENTION

1. Technical Field

This invention relates generally to retracting pet leashes, and more specifically to a pet leash retracting device which mounts on a pet collar and which is designed to maintain a pet leash retractor superior in position to the pet collar.

2. Background

The present invention involves modifications and improvements of the pet leash retractor disclosed in my prior U.S. Pat. No. 4,964,370. That retractor was incorporated in the pet collar, and served to store, extend and retract a pet leash. In order to provide a pet leash which is available at any time its use is needed, retracting pet leashes are available to make the pet leash built into the collar and retractable in a device. These retractors typically cause the pet collar to rotate due to the weight of the retractor mechanism and the leash retracted therein, until the retractor mechanism comes to rest on the underside of the pet's neck, typically a dog. This is undesirable because it results in the owner being attached to a dog by a leash which is attached to the underside of the dog's collar. If the dog crosses in front of the lower, the leash can become tangled and the owner may need to stop and rotate the collar to untangle it. The dog being controlled by a leash attached under its neck also results in the leash irritating the neck of the animal by abrasion. This can result in destruction of the hair on the animal's neck, which could be disastrous for a show dog. In my leash retractor described in U.S. Pat. No. 4,964,370, this problem was addressed by a leash retractor which hung from the underside of the collar, but which had a guide which made the leash retract and extend from a position on top of the dog's neck or near the top. The instant invention is an improvement and modification of that device. What is lacking in my prior invention is a leash retractor which, at rest, positions itself superior to the animal's neck. A leash retractor mounted in this position would provide superior handling characteristics to the owner, and would result in less tangling of the leash, and eliminate the need for a D-ring or other guide for the leash and its handle.

Accordingly, it is an object of this invention to provide a retractable pet leash which attaches to a pet collar, and is designed to position the pet leash retractor superior to the neck of the pet, when the animal's neck is held in a generally horizontal position.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

DISCLOSURE OF INVENTION

According to the present invention, the foregoing and other objects and advantages are attained by a leash retractor which stores, extends and retracts a pet leash and can be mounted on a pet collar. The pet retractor includes a retractor assembly and a counterweight. The retractor assembly includes a housing, a cover which fits on the housing by a snap-fit connection, a main spool, a leash spool, which has a press-fit connection with the main spool, a coil spring which is located on the main spool, and a spring retainer which has a press fit and lock connection with the main spool. The counterweight is mounted generally opposite the retractor sub-assembly on a pet leash. The counterweight is weighted so as to come to rest inferior to the neck of the pet, due to its weight being greater than the weight of the leash retractor.

This leash retractor has a snap-fit connection between the cover and the housing which includes hollow bosses which extend from the housing, each hollow boss having a hexagonal bore, cylindrical studs on the cover are inserted into the hexagonal bore of the hollow bosses and when pressed together in a press-fit engagement, lock the cover and housing together. The main spool of the leash retractor is mounted for rotation on another hollow boss which extends from the housing. The press fit and lock connection of the spring retainer on the main spool is accomplished by an opening in the spring retainer which receives a hub of the main spool. Resilient teeth on the hub are inserted through the opening in the spring retainer and form a locking engagement behind the retainer at the margin of the opening. The hub on the main spool is formed from a hollow cylinder with a pair of longitudinal slots on opposite sides.

The leash retractor has a radial plate on the main spool and axial projections on the hub of the leash spool which engage the radial plate of the main spool. This engagement prevents rotation of the leash spool independent of rotation of the main spool. The spring retainer clip has a cylindrical flange and an axial groove is in the flange. The axial groove of the flange is engaged by a projection in the housing to prevent rotation of the spring retainer.

The leash retractor includes a leash outlet tunnel through which the leash extends and retracts. It also contains a collar tunnel in the housing which is adjacent and parallel to the leash outlet tunnel, and which surrounds a portion of the collar strap of the animal collar on which is mounted the leash retractor. The leash retractor sub-assembly can be immobilized on the leash by having a single thickness of the strap in the collar tunnel and a second thickness of strap outside the collar with the two thicknesses of collar being secured to each other at each end of the collar tunnel.

Typically one end of the collar will be doubled back to form a loop in which the collar buckle is attached.

In accordance with another aspect of the invention, the invention is a leash contractor for mounting on a pet leash which includes a housing assembly which includes a housing, a spring activated leash spool for reeling in a leash, and a closed collar tunnel on one side of the housing to receive a length of collar strap in order to mount the leash retractor on the collar and a closed leash outlet tunnel in the housing adjacent and parallel to the collar tunnel. The leash retractor also includes a retractor sub assembly which contains a leash spool and a cover which mounts on the housing. The housing and cover retain the retractor sub assembly inside the housing. The retractor sub assembly also includes a main spool, a leash wound on the main spool, a ribbon-type steel coil spring on the main spool, and a spring retainer on the main spool. The leash spool is mounted on the main spool with the spring retainer having a press fit and lock connection to the main spool, and the cover having a press fit connection to the housing. Another component of the leash retractor is a counterweight which is attached to the animal collar in the position which maintains the housing assembly and enclosed retractor sub assembly in an uppermost position in relation to the counter weight. The counterweight is positioned so that the housing assembly and the retractor sub assembly come to rest in a position superior to the animal's neck, when the animal's neck is in an approximately horizontal position, and the counterweight comes to rest in a position inferior to the animal's neck.

This leash retractor ensures that the leash retractor at rest will be mounted above the animal's neck. This results in the leash from the leash retractor extending and retracting from a point above the animal's neck.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

BEST MODE FOR CARRYING OUT INVENTION

Referring to FIGS. 1 through 4, the invention is shown to advantage. The best mode of the invention is a counterweighted leash retracting pet collar. The leash retracting portion of this invention is very similar to the leash retractor disclosed in U.S. Pat. No. 4,964,370, of which I am the inventor, and which is incorporated herein by reference. The counterweighted leash retracting pet collar may be assembled as a unit by the manufacturer, or the user may assemble the various parts of the device to a pet collar of his choice. Thus, the housing 12 can be permanently affixed to the collar 14 or it may have a means of attachment, as described in U.S. Pat. No. 4,964,370.

Figure 1:
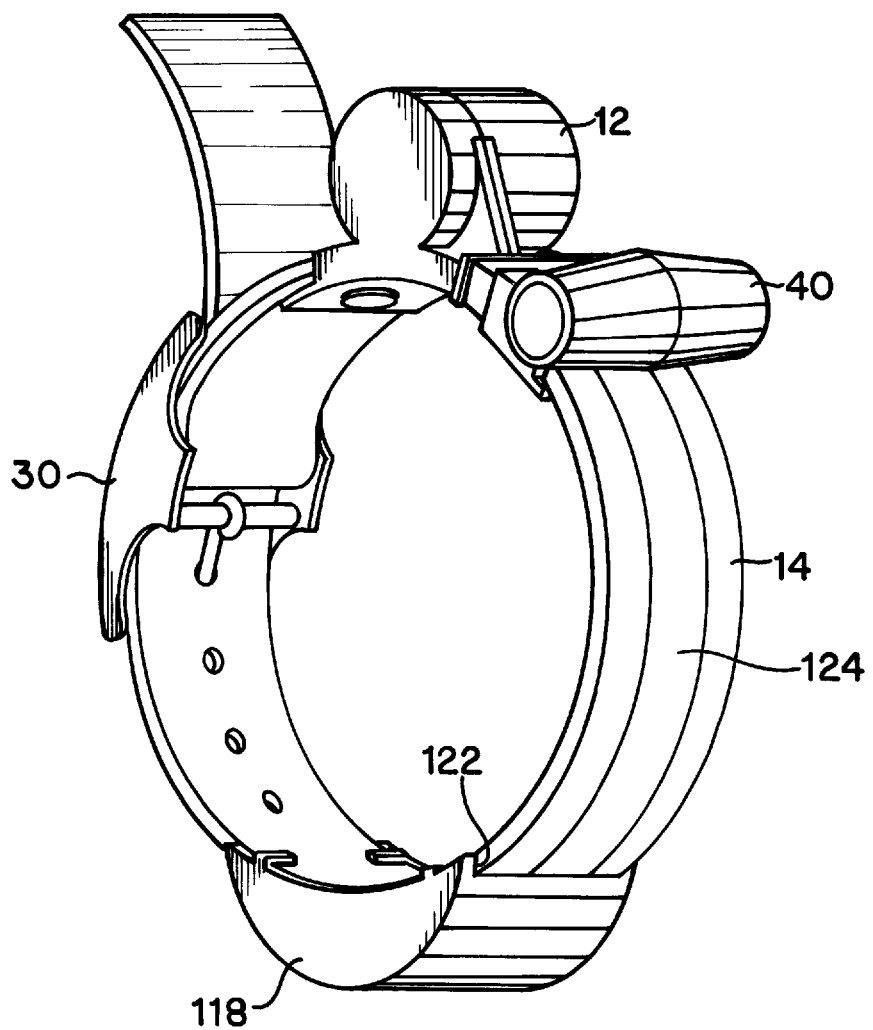
FIG. 1 is a perspective view of the counterweighted pet leash retracting collar.
Figure 2:
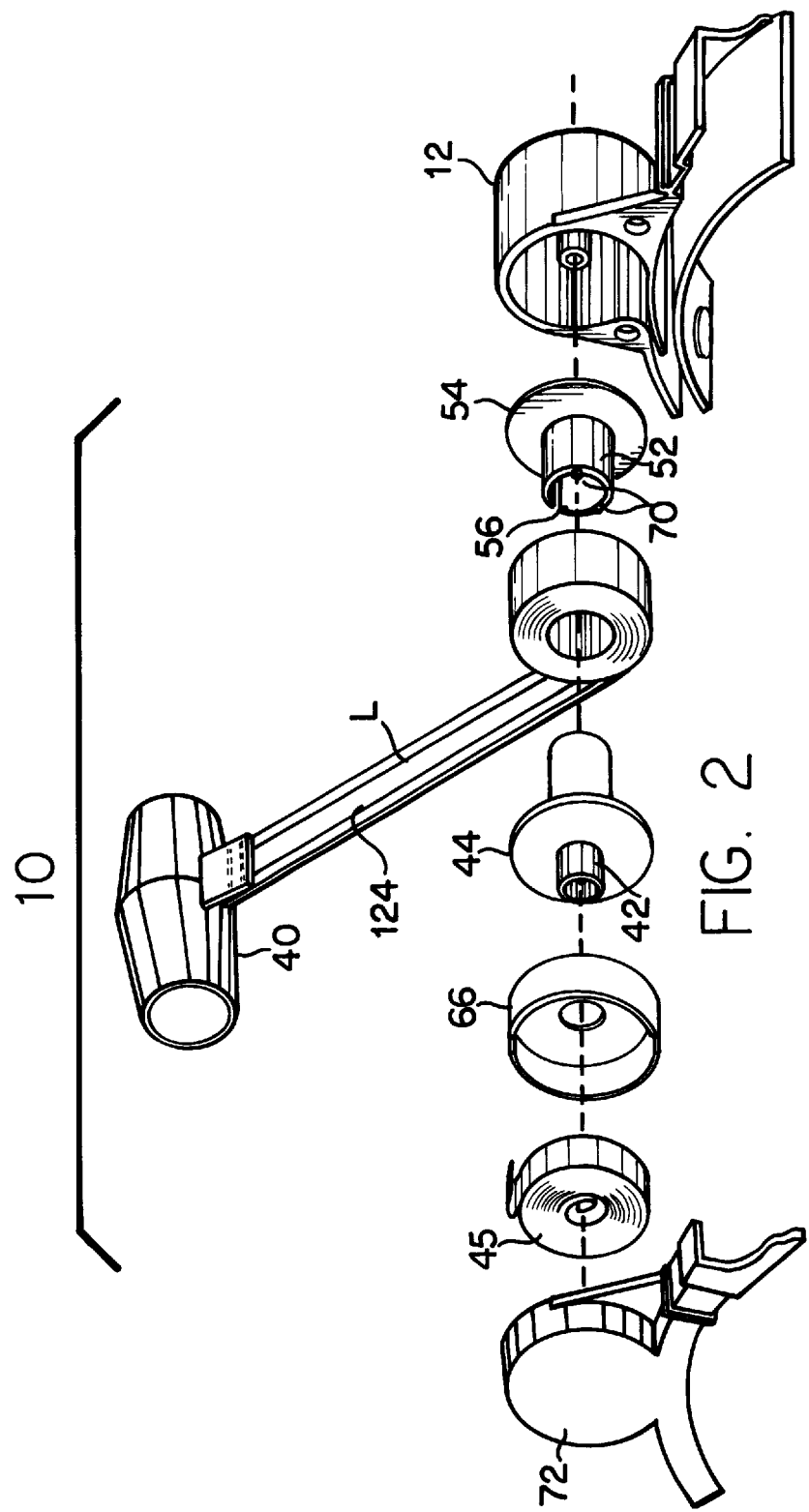
FIG. 2 is an exploded perspective view of the retractor sub-assembly.

The counterweighted leash retracting pet collar includes a retractor sub-assembly 10 which is mounted in housing 12 and cap 72. As seen in FIG. 2, the retractor sub-assembly 10 has a main spool 42 with a radial circular plate 44 at mid length. The leash (L) encircles the main spool 42 on one side of plate 44 and a retractor spring 45 encircles the main spool 42 on the opposite side of plate 44. The end of the main spool 42 within retractor spring 45 is longitudinally slotted in its opposite sides to form two confronting semi-circular portions, each having a hook at the adjacent end of the spool.

Leash spool 52 has a circular flange 54 at one end. A slot 56 extends the length of the spool. Three projections 70 project axially from the spool at the opposite end from the circular flange 54 and engage corresponding holes in plate 44 to prevent independent rotation of the leash spool 52.

The inner end of leash "L" extends through slot 56 and encircles main spool 42 and is anchored to the main spool 42.

The inner end of spring 45 is anchored in spring retainer 66. Rotation of the spring retainer is prevented by a groove on the inside of housing 12 which receives a projection from the spring retainer.

The retractor sub-assembly 10 is retained in housing 12 by a cover 72 as shown in FIG. 2. Cover 72 has a pair of cylindrical studs, each having a press fit engagement in a hexagonal hole in one of a pair of bosses projecting inward from the back wall of housing 12. The resilience of the plastic material of these studs and bosses provides a secure press fit of the parts. Main spool 42 rotates on a boss projecting inward from the back wall of the housing 12.

Housing 12 preferably has a slot molded into it which, when combined with a corresponding slot in cap 72, forms a tunnel which encircles the pet collar. The housing 12 and cap 72 have a similar pair of slots which together form a tunnel for the leash.

At one end of leash "L" is a handle 40, which is a generally cylindrical handle grippable by the user. Leash "L" may include a strip of reflective material 124.

Figure 3:
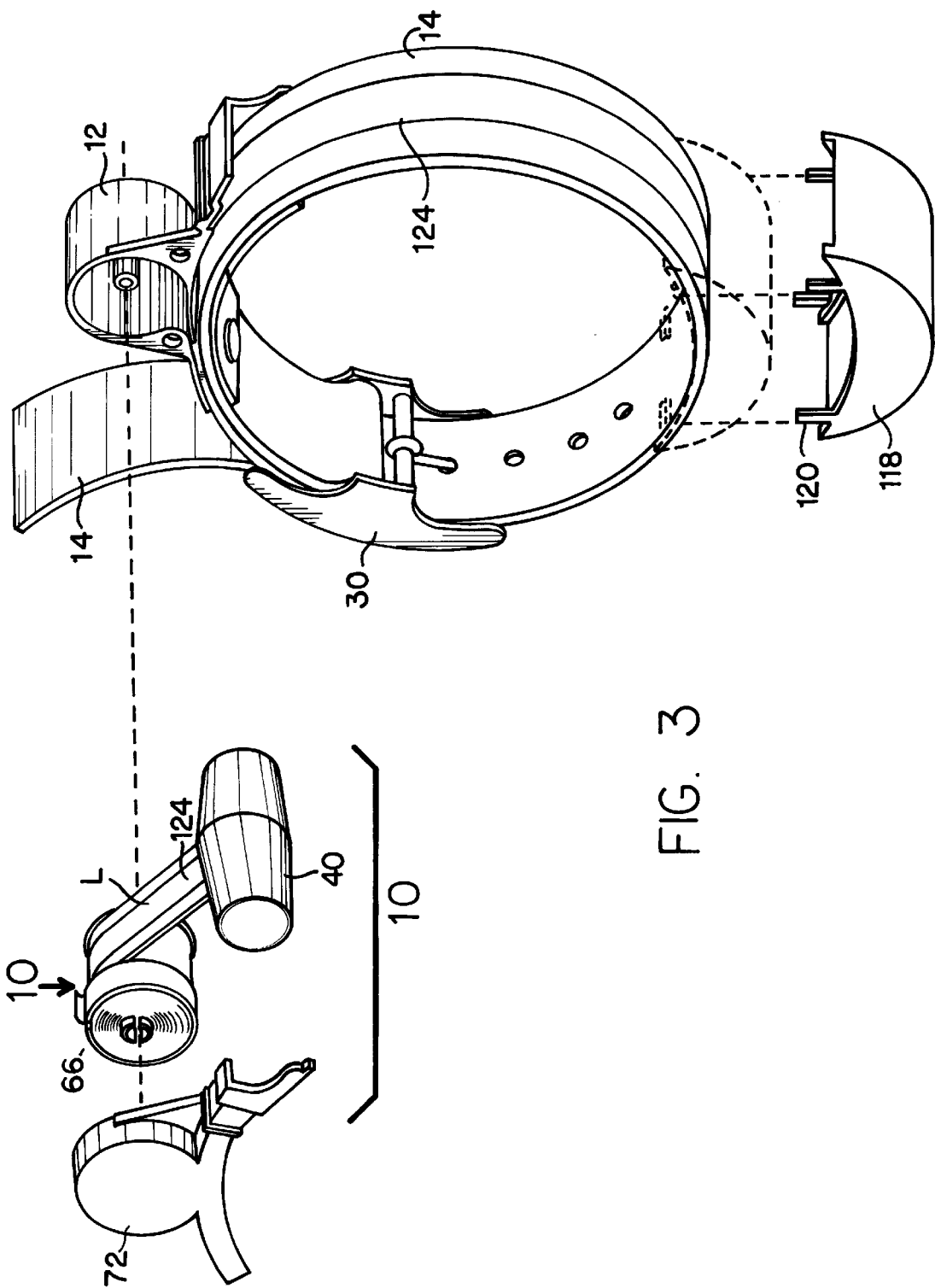
FIG. 3 is an exploded view showing the retractor sub-assembly, the housing, the cap, and the counterweight before installation.
Figure 4:
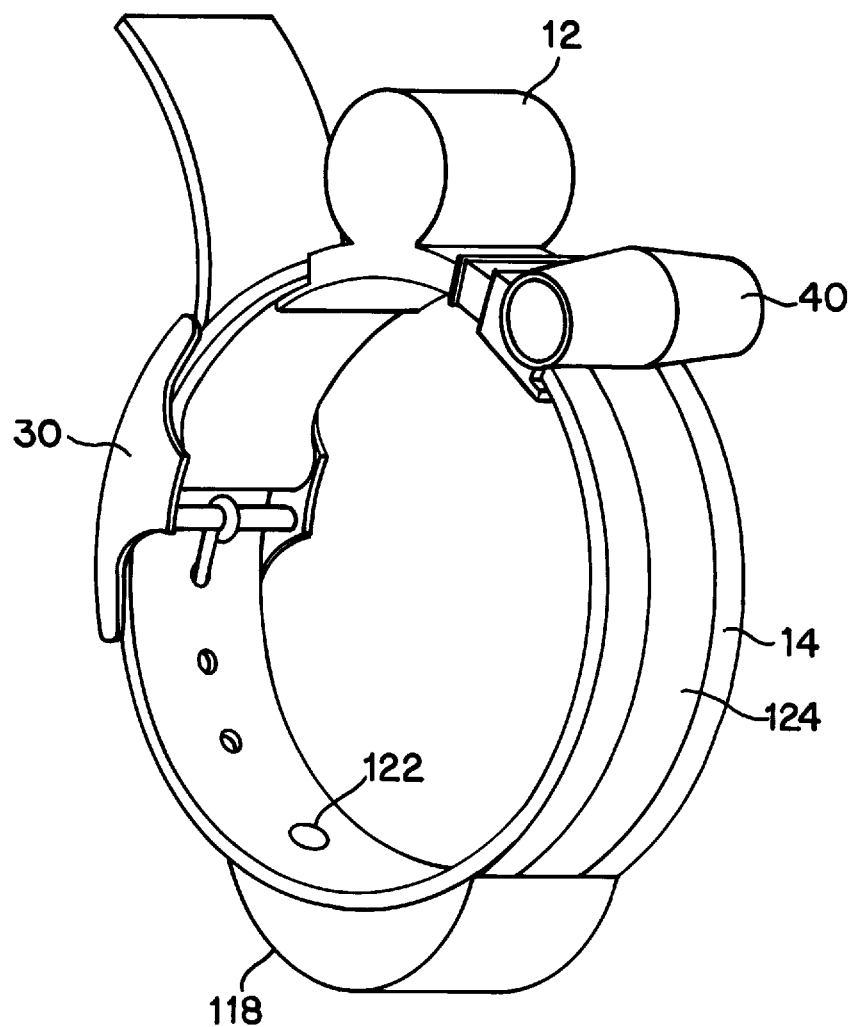
FIG. 4 is a perspective view of an alternate version of the counterweighted leash retracting collar.

As shown in FIG. 3, counterweight 118 is preferably a block made of a heavy material such as lead, bismuth, or even depleted uranium. It has straight sides which parallel the periphery of the pet collar, and a curved inside edge which follows an approximate curve of the pet collar when mounted on a generally cylindrical neck of a pet. Counterweight 118 also has a curved outer surface. Counterweight 118 also has one or a number of mounting tabs 120. These can be bendable projections, and in the preferred mode are four tabs generally located at the corners of the inside edge of the counterweight 118. Counterweight 118 is mounted in relation to buckle 30 and retractor sub-assembly 10 inside housing 12 in cap 72, such that the housing 12 comes to rest if the collar is allowed to freely rotate around the pet's neck, with housing 12 in a superior position to the pet's neck.

The counterweight 118, housing 12, cap 72 and retractor sub-assembly 10 are mounted on a pet collar 14 which has a buckle 30. The pet collar 14 can obviously be made of a variety of materials, including woven nylon, rubber, leather, neoprene, or other suitable flexible materials. In the preferred embodiment, a woven nylon pet collar is utilized with a metal buckle 30. An optional feature is a strip of reflective material positioned on the collar so that the collar reflects the headlights of approaching cars. Housing 12 in cap 72 with enclosed retractor sub-assembly 10 are mounted on collar 14 either in a permanent fashion by gluing or riveting, or may be mounted by the user with ratcheting straps, the application of glue, or by other means.

Retractor sub-assembly 10 is designed so that when leash "L" and handle 40 are fully retracted on to main spool 42 and leash spool 52, spring 45 is still partially wound. This feature is important for reducing the shock on spring 45 and spring retainer 66.

To use the counterweighted leash retracting pet collar, the user may either mount the housing 12, cap 72, and retractor sub-assembly 10, on the pet collar of his choice 14, or he may purchase the unit already permanently attached. The user then mounts the pet collar 14 on the pet. Counterweight 118 is then loosely attached and its position adjusted so that the weight of counterweight 118 and the weight of buckle 30 combined result in housing 12 coming to rest in a position superior to the pet's neck when the neck is in a generally horizontal position.

Counterweight 118 may be located directly on the bottom of collar 14, in an inferior position to the pet's neck. It may also be mounted to one side of the lowest portion of the pet collar 14, depending upon the weight and placement of buckle 30. In any event, counterweight 118 is placed so that its weight when combined with the weight and placement of buckle 30, result in housing 12 coming to rest in a superior position to the pet's neck. Once the appropriate position for counterweight 118 is determined, mounting tabs 120 are bent over pet collar 14 and hold counterweight 118 in a permanent position on pet collar 14. Alternatively, counterweight 118 can be riveted to pet collar 14.

Mounting the components of the invention in this way insures that housing 12, cap 72, and retractor sub-assembly 10 come to rest above the pet's neck. From this position, handle 40 can be grasped by the user and leash "L" can be used to control the dog or other pet. With leash "L" extending and retracting from housing 12 and cap 72 from a position superior to the pet's neck, abrasion of the leash, collar and the pet's neck is eliminated. Tangling of the leash "L" around the pet's neck as he changes position during a walk are also eliminated. This collar provides a permanent and handy way for the user to have a pet leash readily available at all times. The leash and leash retractor are small enough, light enough and inconspicuous enough that it can be left mounted to the pet at all times. The reflective strip 124 on the pet collar 14 and the leash "L" make the pet and the user more visible at night or at dusk, adding a significant degree of safety to both.

While there is shown and described the present preferred embodiment of the invention, it is to be distinctly understood that this invention is not limited thereto but may be variously embodied to practice within the scope of the following claims.

I claim:

1. A counterweighted pet leash retracting collar comprising:
   a. a retractor assembly having
      1. a housing, containing a spring retainer fitting with a cylindrical flange within said housing, and an axial groove in said flange engaged by a projection in said housing to prevent rotation of said spring retainer, an enclosed leash outlet tunnel in said housing for a leash, and an enclosed collar tunnel in said housing adjacent and parallel to said leash outlet tunnel to receive a length of collar strap of an animal collar for mounting said retractor assembly on said collar,
      2. a cover which fits by snap fit connection on said housing, in which said snap fit connection between cover and housing comprises hollow bosses in said housing, each having a hexagonal bore, and cylindrical studs on said cover insertable
      3. a main spool in said housing, mounted for rotation on a hollow boss extending from said housing, and containing a hub comprising a hollow cylinder having a pair of longitudinal slots in its opposite sides, said teeth being on the end of said hub between said slots with the hub portions between said slots providing resilient supports for said teeth, and also containing a radial plate on said main spool, and axial projections on the hub of said leash spool engaging in an opening in said plate to prevent independent rotation of said leash spool
      4. a leash spool having a press fit connection with said main spool,
      5. a coil spring on said main spool, and
      6. a spring retainer having a press fit and lock connection with said main spool, which comprises an opening in said spring retainer to receive a hub on said main spool, and resilient teeth on said hub insertable through said opening and exerting locking engagement behind said retainer at the margin of said opening;
   b. a leash which is stored in and retractable from said retractor assembly; and
   c. a counterweight mounted opposite said retractor assembly on a pet collar, and which causes said retractor assembly to remain superior to said pet collar.

2. The counterweighted pet leash retracting collar as defined in claim 1, said collar having a single thickness of said strap in said collar tunnel and a second thickness of strap outside of said collar tunnel, said second thickness being secured outside opposite ends of said collar tunnel to said strap in said tunnel.

3. The counterweighted pet leash retracting collar as defined in claim 2, one end of said strap being doubled back to form a loop for attachment to a collar buckle.

4. Leash retracting animal collar comprising;
   a housing assembly having a housing containing a spring activated leash spool for reeling in said leash, an enclosed collar tunnel in one side of said housing to receive a length of collar strap of said animal collar for mounting said housing assembly on the collar, an enclosed leash outlet tunnel in said housing adjacent and parallel to said collar tunnel, said housing containing said collar tunnel and leash tunnel;
   a retractor sub-assembly containing said leash spool and a cover on said housing, which retains said retractor sub assembly in said housing, said retractor sub-assembly comprising a main spool, a leash on said leash spool, a ribbon type steel coil spring on said main spool, and a spring retainer on said main spool, said leash spool being mounted on said main spool, said spring retainer having a press fit and lock connection to main spool, and said cover having a press fit connection to said housing;
   and a counterweight for attaches to said animal collar for maintaining said housing assembly and said retractor sub-assembly in an uppermost position in relation to said counterweight.

5. The pet leash retracting collar of claim 4, in which said snap fit connection between cover and housing comprises hollow bosses in said housing, each having a hexagonal bore, and cylindrical studs on said cover insertable with press fit engagement in said bores.

* * * * *